(12) United States Patent
Milburn et al.

(10) Patent No.: US 6,283,723 B1
(45) Date of Patent: Sep. 4, 2001

(54) INTEGRATED COMPRESSOR EXPANDER APPARATUS

(75) Inventors: Ski Muir Milburn, Boulder; Jeffrey Lewis Barber, Indian Hills; Jeremiah J. Cronin, Niwot, all of CO (US)

(73) Assignee: Vairex Corporation, Boulder, CO (US)

( * ) Notice: Subject to any disclaimer, the term of this patent is extended or adjusted under 35 U.S.C. 154(b) by 0 days.

(21) Appl. No.: 09/014,070

(22) Filed: Jan. 27, 1998

Related U.S. Application Data
(60) Provisional application No. 60/035,687, filed on Jan. 27, 1997.

(51) Int. Cl.[7] ............................................. F04B 1/04
(52) U.S. Cl. ...................... 417/273; 417/415; 417/466; 417/467; 417/534; 92/72
(58) Field of Search ........................... 714/415, 273, 714/466, 467, 534; 92/72, 66; 60/39.07

(56) References Cited

U.S. PATENT DOCUMENTS

| | | |
|---|---|---|
| 2,130,037 | 9/1938 | Skarlund . |
| 3,583,286 | 6/1971 | Chiappulini et al. . |
| 3,659,417 | * 5/1972 | Grieb .................... 60/39.07 |
| 3,878,821 | 4/1975 | White . |
| 4,066,002 | 1/1978 | Eastman . |
| 4,325,331 | 4/1982 | Erickson . |
| 4,907,950 | 3/1990 | Pierrat ..................... 417/273 |
| 5,004,404 | 4/1991 | Pierrat ..................... 417/273 |
| 5,114,321 | 5/1992 | Milburn et al. ............ 417/534 |
| 5,434,016 | 7/1995 | Benz et al. . |

FOREIGN PATENT DOCUMENTS

| | | |
|---|---|---|
| 184042A3 | 11/1986 | (EP) . |
| 269-882 A | * 6/1988 | (EP) ................................. 417/273 |

OTHER PUBLICATIONS

Milburn et al., "A Variable Displacement Compressor/Expander for Vehicular Fuel Cell Air Management," SAE Technical Paper Series 961713, 8/5–8/95, pp63–69.

Milburn., "Introducing a High Efficiency Variable Positive Displacement Automotive Supercharger," SAE Technical Paper Series 940845, 2/28194–3/36/94, pp 1–11.

Close et al., "The New Collins Compact Scotch Yoke Engine," SAE Technical Paper Series 920675, 8/13–16/90, pp91–99.

Aitken et al., "The CMC Scotch Yoke Engine–A Family of Engiones for Automotive Use," SAE Technical Paper Series 901532, 8/13–16/90, pp 1–18.

* cited by examiner

Primary Examiner—Cheryl J. Tyler
(74) Attorney, Agent, or Firm—Charles E. Rohrer

(57) ABSTRACT

Fluid displacement apparatus with a set of opposing pistons in traveling chambers and a set of opposing pistons in stationary bores; a second embodiment with all pistons in traveling chambers; a third embodiment with all pistons in stationary bores. In each embodiment the displacement of the pistons can be different and the displacement can be variable. The apparatus is connected to a fuel cell stack to supply compressed gaseous fluid from a portion of the chambers and receive exhaust from the fuel cell stack in other chambers to perform an expander function. The apparatus can also be connected to a fuel cell stack and a reformer to supply compressed gaseous fluid to both and to receive exhaust from both as an expander. The chambers are sized differently to provide a pressure ratio across the fuel cell stack.

77 Claims, 5 Drawing Sheets

INTEGRATED COMPRESSOR EXPANDER APPARATUS

This application claims the benfit of U.S. Provisional Application Ser. No. 60/035,687, filed Jan. 27, 1997.

This invention relates to the field of positive fluid displacement machines that have use throughout the automotive, chemical processing, power generation and refrigeration equipment industries. These industries and others will soon have fuel cell energy sources available for executing their functions. It is expected that fuel cell powering systems will be one of the major beneficiaries of the invention to be described.

BACKGROUND OF THE INVENTION

There are numerous devices which displace and/or expand fluids, both gaseous and liquid. Such devices have been implemented in both piston and rotary apparatus. They have been implemented within the same drive line and sometimes on the same shaft. However, the compression and expansion functions have not been implemented within the same device.

The present invention builds upon the technology of U.S. Pat. Nos. 4,907,950, 5,004,404 and 5,114,321, all of which are incorporated herein by reference. Those patents describe a variable positive fluid displacement device comprised of two sets of piston pairs operating in a rigidly connected configuration, each piston pair at 90 degrees to the other. The above-referenced patents have been used as a compressor and also as an expander and in either a 2 or 4 piston configuration. All pistons are operated from a common drive shaft and the pumping/compression or vacuum/expansion of each chamber port has a different peak position in time as a function of the position of the chamber valving which is also driven and controlled by shaft rotation.

The variable positive displacement device of the above-referenced patents can be used to benefit those fuel cell systems in which compressed air is used as an oxygen source. A first such device is used as a compressor with the variable displacement feature used to provide control over fuel cell power output. For vehicular use such control acts as an accelerator to provide a desired transient response. By using a second variable or fixed displacement device as an expander, the overall efficiency of the system can be improved. As an expander, it will return power to the system as a function of the amount of energy available to its intake stream and its recovery efficiency. This now has the desirable result of lowering the power consumption for the compressing function. These concepts are discussed in the publication, incorporated herein by reference, "A Variable Displacement Compressor/Expander for Vehicular Fuel Cell Air Management," SAE International, 400 Commonwealth Drive, Warrendale, Pa. 15096-0001. U.S. Pat. No. 5,434,016 discusses the use of a rotary compressor in a fuel cell system with a variable capacity expander, both compressor and expander preset to desired values.

SUMMARY OF THE INVENTION

Briefly stated, this invention provides for the performance of more than one function in a single device with at least one set of opposed pistons constructed to operate in accordance with the basic principle of the three U.S. Patents mentioned above and incorporated herein by reference. This invention recognizes and takes advantage of the relative independence of each piston in a piston pair to set them to operate as different devices. Thus, for example, one piston operates as a compressor while a second piston operates as an expander. Since both pistons are on the same drive shaft and are rotating at the same speed, power is returned to the drive shaft by the expander thus improving the efficiency of the compressor—all done in the context of a single integrated device.

An integrated compressor/expander with two pairs of pistons is especially advantageous. One pair can be used for compression—a second pair for expansion, all within one device to save weight, space and cost while providing efficient compression and means for power output control. Additional benefits are possible with this arrangement, such as providing a device with different volumetric displacements per revolution per pair. If desired, all four pistons can have different volumetric displacements. When used with a fuel cell inserted between the compressor function and expander function, the different volumetric displacements per opposing pair results in a pressure ratio generated across the fuel cell. The maximum value of the pressure ratio is the relative displaced volumes of the compressor and expander expressed as follows:

$$\text{Pressure Ratio (Pr)} = \frac{\text{Volume (compressor)/time}}{\text{Volume (expander)/time}}$$

This can create a more stable Pr for applications where it is desired that the flow mass delivered by the system be primarily a function of the speed of the input drive shaft to the compressor. Dynamic control of the pressure ratio can be obtained for the system by taking advantage of the technology in the referenced patents to incorporate a variable displacement capability. Control range could vary from a maximum Pr of the basic design displacements to a minimum Pr=1, where the displacements are of equal value. By enabling control of the relative displacements per revolution and control of the revolutions per minute, two degrees of freedom are provided to enhance the control system of the end application. For example, the variable displacement feature can be used to control pressure ratio independently of compressor speed so that changes in compressor speed can be used to result in relatively linear changes in fuel cell power output.

The device of this invention can be used to supply more than one device. For example, in a fuel cell system, one piston, operating as a compressor, can supply compressed air to the fuel cell stack at a first pressure; a second piston, operating as a compressor, can supply compressed air to a reformer at a second pressure; a third piston, operating as an expander, can receive exhaust at a third pressure from the fuel cell stack; and a fourth piston, operating as an expander, can receive exhaust at a fourth pressure from the reformer.

A first embodiment of the integrated device is described herein with a first set of two opposing pistons operating in traveling cylinders and a second set of two opposing pistons operating in stationary bores. The second set of pistons are at right angles to the first set. A second embodiment has both a first set and a second set of opposing pistons operating in traveling cylinders. A third embodiment utilizes both sets of opposing pistons in stationary bores. In all embodiments, only one set of opposing pistons could be used, if desired. In all embodiments, the device can utilize the variable displacement capability of the three patents named above and incorporated by reference herein, or the device can be of fixed displacement.

Note that the pistons can be operated in parallel to supply a function, for example, compression, or they could be operated in series to provide a multi-stage function.

The advantages of such devices are numerous and some are mentioned above. Several other advantages are as follows:

(1) A piston compressor produces a higher Pr in a single stage than a rotary compressor. This can lower the number of compressor stages required to obtain a pressure ratio greater than two.

(2) The piston compressor does not need to rotate as fast as a rotary compressor to begin generating pressure.

(3) Good sealing systems for a piston compressor are easier to achieve and not as costly especially as the Pr increases. Piston seals have cheaper parts than the costly precision parts used in rotary compressors.

(4) Since piston compressors can operate at slower speeds than rotaries, there is less noise generated.

(5) With this invention, the length of the mechanical train between the compressor function and the expander supplemental power input to the drive shaft is considerably shorter, i.e. one less machine is in the loop. This results in a lower frictional loss to the system and less power is required for the compressing function.

(6) Being able to control the Pr with the expander function within the same device can eliminate the need for a pressure regulation valve.

DETAILED DESCRIPTION

Figure 5:
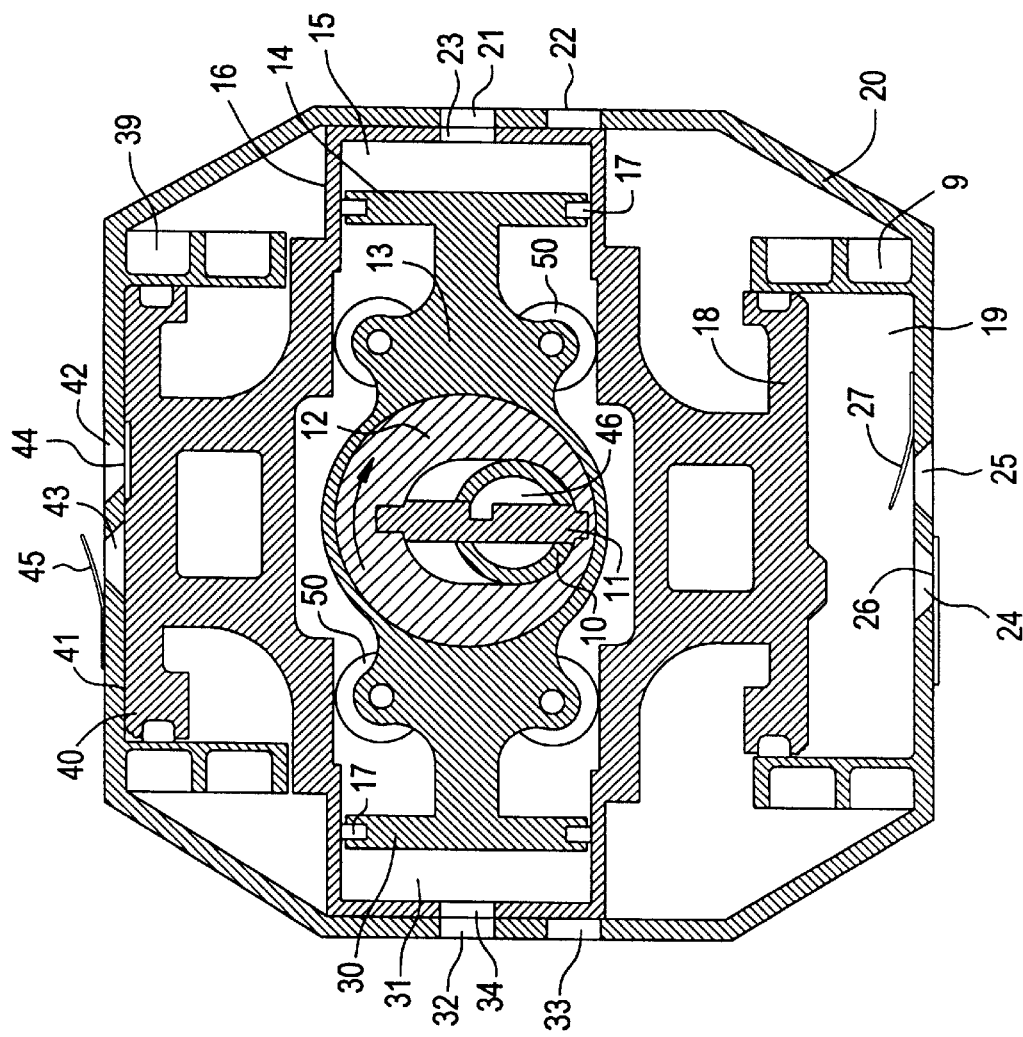
FIG. 5 is a layout and cross-section of a first embodiment of an integrated compressor/expander apparatus.

FIG. 5 shows a drive shaft 10 connected to a drive motor, not shown, providing power to the apparatus of the invention. The drive shaft 10 is connected through a key 11 to a variable eccentric drive 12. Variable eccentric drive 12 rotates within and is solidly connected with the piston drive 13 through bearings, not shown. First piston 14 is rigidly connected to the piston drive 13 and is located within a traveling bore (chamber) 15 formed by walls 16 and piston rings 17. The walls 16 of the traveling chamber are rigidly connected to a second piston 18 which is positioned in a stationary bore 19. The walls 9 of bore 19 are rigidly connected to the outer case 20.

First inlet port 22 and outlet port 21 are located in the outer case 20 and are connected to the traveling chamber 15 by port 23 located in adjacent wall 16 of traveling chamber 15. Second inlet and outlet ports 24 and 25 are located in the outer case 20 and connect with the stationary bore 19. Reed valves 26 and 27 open and close ports 24 and 25 to connect the stationary bore 19 with the exterior of the outer case 20.

FIG. 5 shows that first piston 14 is rigidly connected to an opposing third piston 30 forming a first piston pair. Piston 30 operates within a second traveling chamber 31 which is opened and closed to the exterior of outer case 20 through inlet and outlet ports 32 and 33 together with port 34 located in the adjacent wall of chamber 31.

FIG. 5 also shows a fourth piston 40 operating in a stationary bore 41 formed by walls 39. FIG. 5 shows piston 40 at the top of its stroke where the volume of bore 41 is reduced to a minimum. Piston 40 is rigidly connected to the walls 16 of traveling chambers 15 and 31 and is diametrically opposite to second piston 18, forming a second piston pair. Bore 41 is connected through the outer case 20 by inlet and outlet ports 42 and 43 and reed valves 44 and 45.

Four cam rollers 50 provide a driving point of contact between the walls 16 of the traveling chambers 15 and 31 and the piston drive 13. In that manner, the significant drive forces acting on the walls of the traveling chambers are transferred through the drive cam rollers 50 rather than through the piston seals 17. In that manner, the piston seals perform the sealing function only and are spared from the wear they would be subjected to if they were performing a drive function.

Major features of the configuration shown in FIG. 5 include the solid connection between the piston pairs 14 and 30 and the drive shaft 10 through the eccentric key 11 and the eccentric drive 12. Also important to note is the rigid connection between the walls 16 of the traveling chambers 15 and 31 and the opposing piston pairs 18 and 40. The configuration shown in FIG. 5 provides a compact unit which integrates two piston pairs where one piston pair can be used to perform a compressing function while the other piston pair performs an expanding function. For example, the arrangement shown in FIG. 5 could be used with the large piston area of pistons 18 and 40 performing the compressing function while the smaller pistons 14 and 30 perform an expanding function. The throw of both piston pairs is controlled by the position of key 11 along a ramp 46 which determines the amount of eccentricity. The eccentricity of the eccentric drive may be varied from zero providing no displacement to a maximum eccentricity with a maximum displacement.

Figure 1:
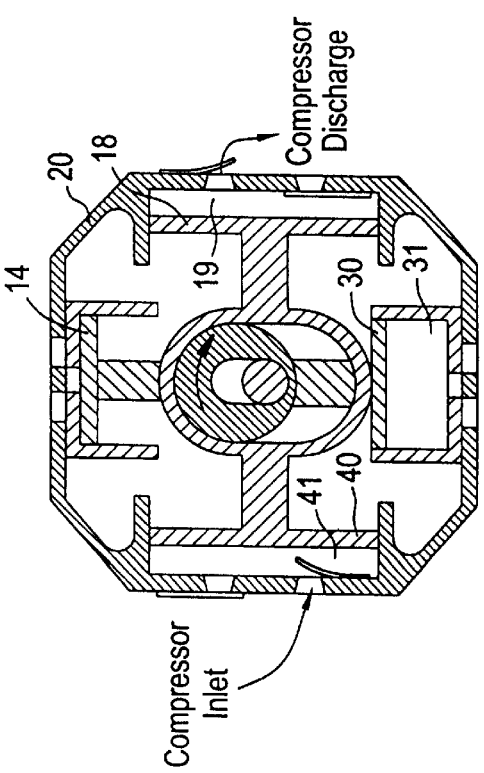
FIGS. 1–4 show the valving principles of the invention with the eccentric drive shaft shown in four positions, each 90 degrees moved from the next.

The operation of the device shown in FIG. 5 in performing a compressing function and an expanding function is shown in FIGS. 1–4. Note that the piston pairs in FIGS. 1–4 are shown in a position rotated by 90° from that shown in FIG. 5, that is, the stationary bores contain a piston pair moving horizontally rather than vertically. In FIG. 1 the eccentric drive is shown at top center with expander piston 14 at the top of its stroke reducing traveling chamber 15 to a minimal volume. The position of piston 30 provides the maximum volume dimension to chamber 31. In the position shown in FIG. 1, pistons 18 and 40 are both midway through their stroke length. Note that the inlet port is open for piston 40 and the exhaust or discharge port is open for piston 18. The inlet and outlet ports of pistons 14 and 30 are both closed.

Figure 2:
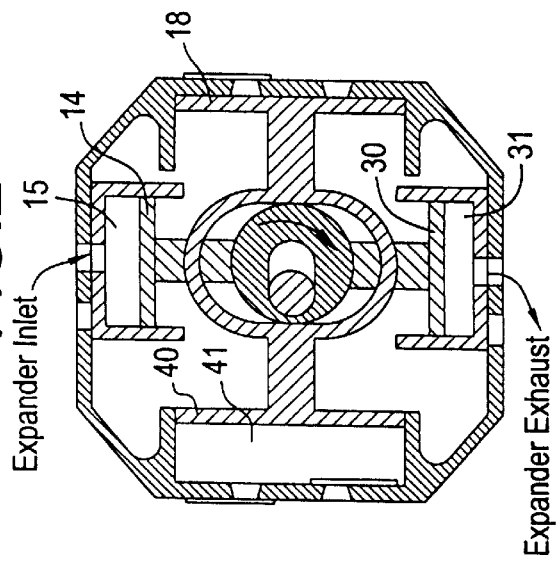

FIG. 2 shows the position of the pistons and the valving of the ports with the eccentric drive rotated 90 degrees in a clockwise fashion from the position shown in FIG. 1. In the position of FIG. 2, pistons 14 and 30 are halfway through their strokes with the inlet port open to chamber 15 and the exhaust port open to chamber 31. Piston 18 is moved to a position which minimizes the volume of bore 19 while piston 40 has moved to a position maximizing the volume of bore 41. The inlet and outlet ports of chambers 19 and 41 are both closed.

Figure 3:
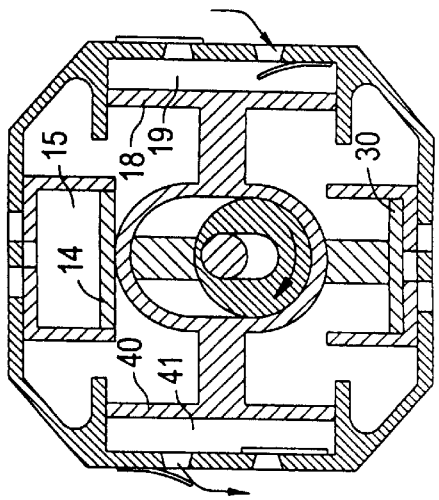

In FIG. 3 the eccentric drive has moved 90 degrees from the position shown in FIG. 2 resulting in a position which is opposite to that shown in FIG. 1. Similarly, in FIG. 4 where the eccentric drive has moved to a position 90 degrees from that shown in FIG. 3, thus 180 degrees from that shown in FIG. 2, the piston positions are opposite to that shown in FIG. 2.

FIGS. 1–4 illustrate that pistons 14 and 30 rotate in an orbital fashion moving in two planes. In the vertical or Y plane the pistons 14 and 30 move within the walls of the traveling chambers 15 and 31 to perform, for example, an expanding function. The pistons 14 and 30 bear against those walls and cooperate with the drive rollers 50 shown in FIG. 5 to move the traveling chambers in a horizontal plane, the X plane. Note that the inlet and outlet ports to chambers 15 and 31 are opened and closed by the sliding action of the chamber walls relative to the outer case 20.

The pistons 18 and 40 are moved in the X plane by their rigid connection to the walls of the traveling chambers 15 and 31. As the pistons move toward the right, the compressor inlet to the chamber 41 is opened while the compressor outlet is closed. Conversely, the compressor discharge for chamber 19 is open while the compressor inlet is closed. When the pistons 18 and 40 are moved toward the left in the X plane, the opposite occurs, that is, chamber 19 is opened to the compressor inlet while chamber 41 is connected to the compressor outlet.

Figure 4:
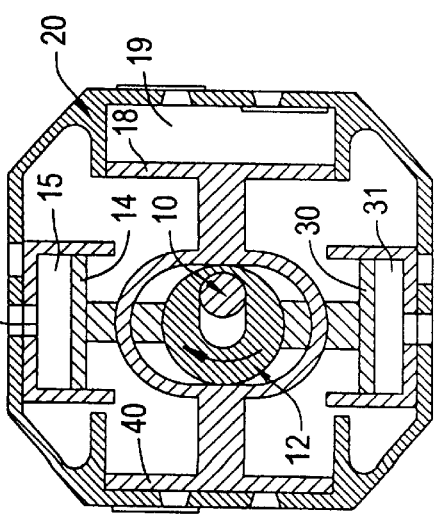

FIG. 2 shows that chamber 15 has moved in the X plane so that it is connected to the expander inlet while FIG. 4 shows that it is connected to the expander exhaust. Similarly, chamber 31 is connected to the expander exhaust in FIG. 2 and connected to the expander inlet in FIG. 4.

The configuration of the inventive device illustrated in FIGS. 1–5 provides for two pistons operating within moving chambers and another two pistons operating within stationary bores. As explained above, the piston pairs can be operated as an integrated compressor/expander device. In the example shown, the smaller expander pair of pistons are located at 90° from the larger compression pair of pistons providing an integrated compressor/expander on the common drive shaft 10 in a single compact case. If desired, the smaller piston pair could be the compressor while the larger piston pair performs an expansion function. In such a configuration, it may be desirable to provide additional air mass and/or other gases through the expander from a source other than the compressor. Such a source is present in automotive fuel cells where the exhaust from a high pressure reformer such as hydrocarbon, ammonia, etc. can be routed to the expander. Reformers are used in some fuel cell systems to provide fuel to the fuel cell stack. The invention provides the ability to isolate multiple pressurized exhaust systems, which are at different pressures, to allow one expander device to effectively handle differential flows.

By providing the surface area of a first piston pair greater than the surface area of a second piston pair, a pressure ratio is developed between the two. In many applications, the connection of the input and output lines will advantageously result in an energy return to the system through the use of one of the piston pairs performing an expander function. Since the expander pistons in this device provide power to the same shaft that drives the compressor, there are minimal losses due to bearings and shafts that otherwise would occur if the two devices were separated. As a consequence, there is a minimum number of power transfers and associated friction losses, thus improving the ultimate power recovery.

It should also be noted that depending upon the connections of inlet and outlet lines, the device can be operated as a compact multi-stage compressor within essentially the same space currently utilized for a one-stage compressor. The device could also be utilized as a multi-stage expander and might also be used as a multi-stage vacuum pump.

The device shown in FIGS. 1–5 can be connected to operate as a two to four-stage compressor, a two to four-stage expander or a two to four-stage vacuum pump. For example, one connecting scheme to operate the device as a four-stage air compressor could be accomplished by connecting inlet port 22 to ambient air and outlet port 21 of a first stage to inlet port 32, outlet port 33 of a second stage to inlet port 42, outlet port 43 of a third stage to inlet port 25, outlet port 24 of a fourth stage to a device utilizing the compressed air.

Figure 6:
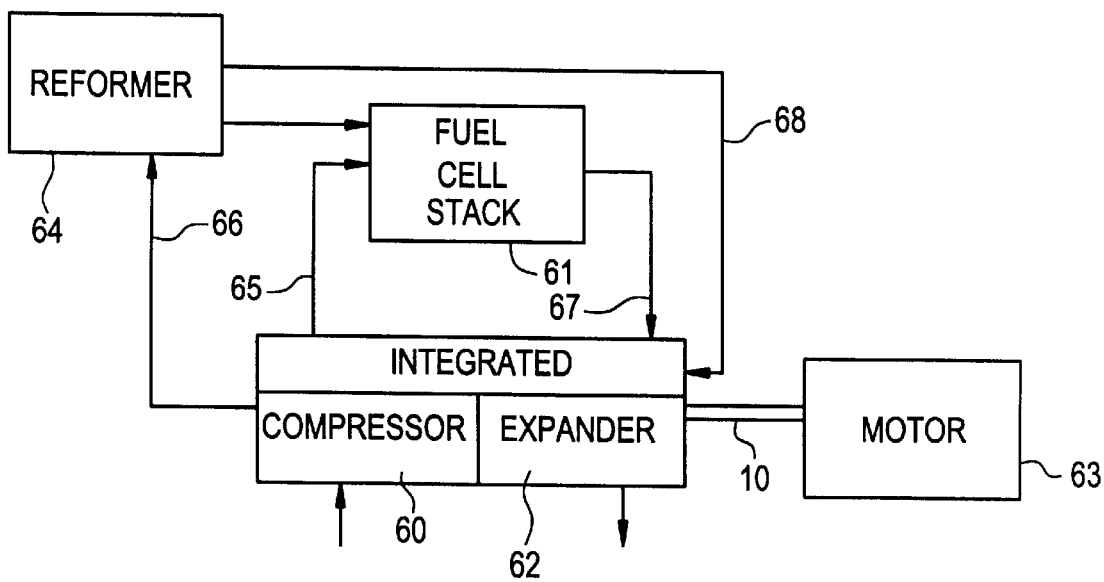
FIGS. 6 and 7 are simplified block diagrams of fuel cell systems utilizing the invention.

As mentioned above, the inventive apparatus may be used in a fuel cell system. FIG. 6 shows a simplified block diagram of a fuel cell system wherein the device is utilized as an integrated compressor/expander, for example, one set of piston pairs operating as a compressor 60 supplying compressed air to the fuel cell stack 61 and the second piston pair 62 operating as an expander 62 connected to receive the exhaust of the fuel cell stack and perform an expansion function to recapture energy and produce a more efficient system. The compressor/expander is mounted on drive shaft 10 which is connected to the drive motor 63. The compressor/expander may be constructed with a fixed displacement ratio between the two functions to provide a desired pressure ratio across the stack 61. It may also utilize the variable displacement compressor of the referenced patents to maintain the desired pressure ratio across a wide range of drive shaft speeds from motor 63.

FIG. 6 also shows a reformer 64 which can be used with certain types of fuel cells to produce a needed chemical as input to the fuel cell. For example, in a polymer-electrolyte membrane (PEM) fuel cell, also known as a proton exchange membrane fuel cell, a reformer may be used as a source of hydrogen input to the fuel cell. The reformer makes use of a hydrocarbon or other appropriate chemical to produce hydrogen in quantity when reacted with a high pressure air source, catalysts, etc.

The inventive apparatus may be used as both a high pressure air source for the reformer and a lower pressure air source for the fuel cell by utilizing one piston or piston pair for the reformer and one piston or piston pair for the fuel cell. Separate output lines 65 and 66 lead from the compressor 60 to the respective applications.

Similarly, energy may be separately recovered from the reformer and the fuel cell stack by connecting line 67 from the fuel cell to a piston or piston pair in expander 62 and by connecting line 68 from the reformer to a different piston or piston pair in expander 62. In that manner, there is no need to join the exhaust of the reformer and the fuel cell together on one input to an expander—such joining creates back pressure problems which are avoided by use of the invention.

Figure 7:
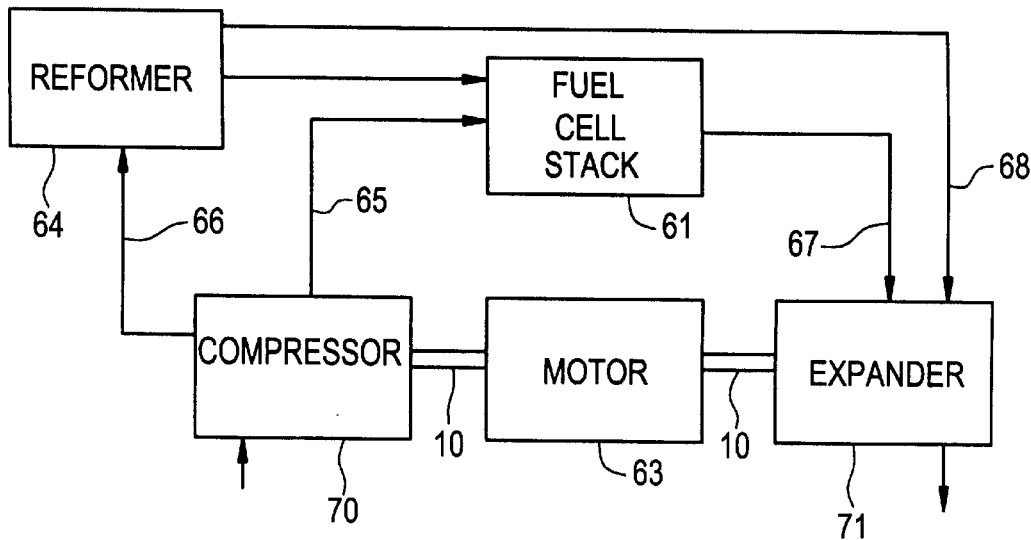

The inventive apparatus may also be used in a fuel cell system shown in FIG. 7 with a first unit 70 operated as a two or four-piston/stage compressor and a second unit 71 operated as a two or four-piston/stage expander. The compressor and expander may be constructed with a fixed or variable displacements, both fixed, both variable, or one fixed and the other variable.

The separate connections 65 and 66 of the compressor 70 to the fuel cell stack 61 and the reformer 64 together with the separate connections 67 and 68 to the expander 71 may be utilized as stated above in regard to FIG. 6.

Figure 8:
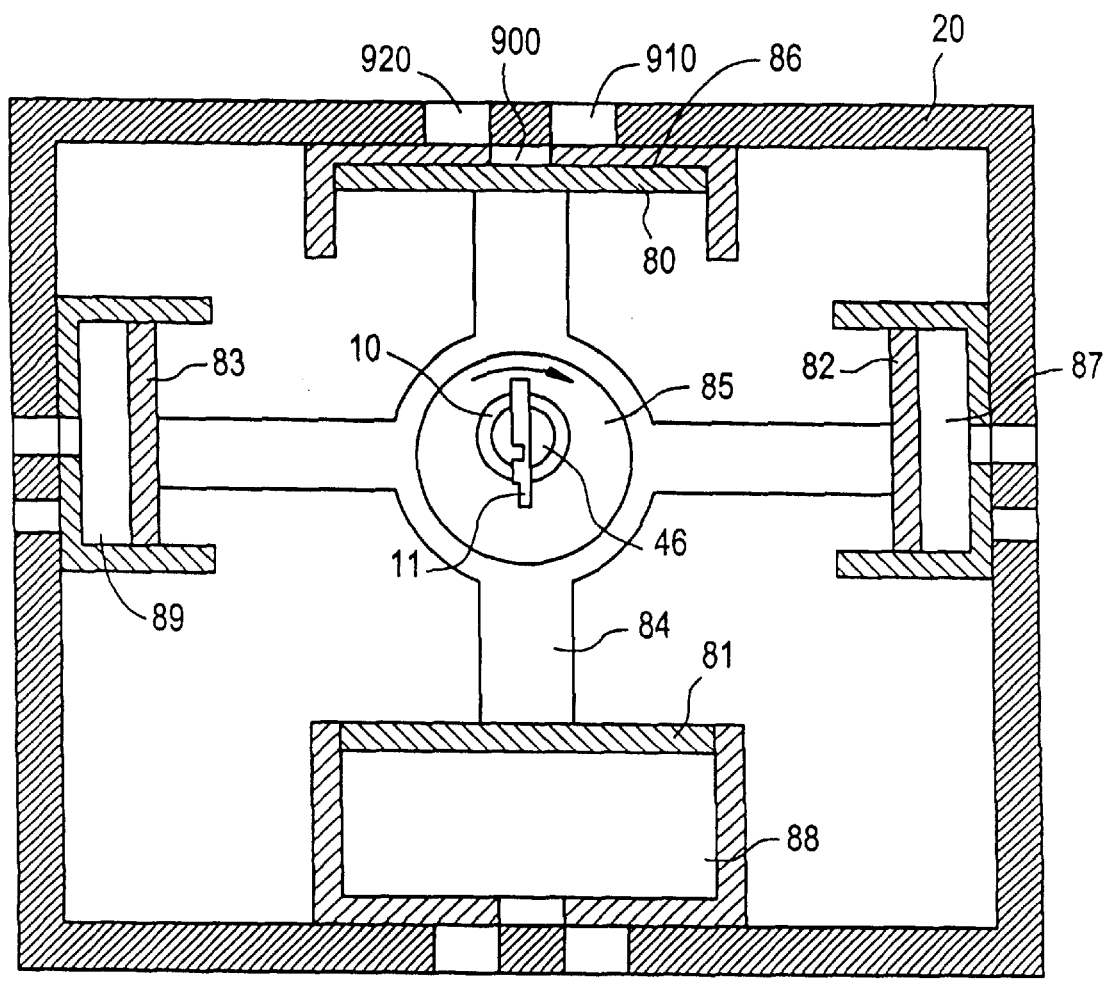
FIGS. 8 and 9 show a second and third embodiment of an integrated compressor/expander apparatus.

FIG. 8 shows an integrated compressor/expander which differs from the device of FIG. 5 in that both piston pairs operate in traveling cylinders. There is no stationary bore.

A first piston pair is comprised of large surface area pistons 80 and 81 while a second piston pair is comprised of smaller surface area pistons 82 and 83. Pistons 80–83 are rigidly connected to piston drive 84 which is solidly connected through bearings, not shown, to variable eccentric drive 85. Eccentric drive 85 is connected to drive shaft 10 through a key 11. The throw of the pistons 80–83 is controlled by the position of key 11 along a ramp 46 which determines the amount of eccentricity. The eccentricity of the eccentric drive may be varied from zero providing no displacement to a maximum eccentricity with maximum displacement.

Piston 80 is located in a first traveling chamber 86, piston 81 is located in a second traveling chamber 88, piston 82 is located in a third traveling chamber 87, and piston 83 is located in a fourth traveling chamber 89. A first chamber port 900, a first inlet port 910 and first outlet port 920 coact with the sliding movement of chamber 86 to connect chamber 86 to the exterior of outer case 20. Similarly, chambers 87, 88 and 89 are connected to the exterior of outer case 20 through corresponding chamber, inlet and outlet ports which coact with the sliding movement of the respective traveling chambers. Pistons 80–83 are moved in an orbital fashion by the drive shaft according to the degree of eccentricity provided while the traveling chambers 86–89 are moved in one plane each by the piston.

The device of FIG. 8 can also be used in the fuel cell systems of FIGS. 6 and 7 as an integrated compressor/expander. The surface area of the first piston pair is different from the surface area of the second piston pair to provide a pressure ratio as described above. The device of FIG. 8 can have a fixed displacement built in or can be made variable. It can be either a two piston or a four piston device. In the system of FIG. 7, the device of FIG. 5 may operate as a compressor and the device of FIG. 8 as an expander, or vice versa. One can be fixed and the other variable. With different displacements, a pressure ratio suitable for many different fuel cell systems can be provided and maintained over a wide range of operating speeds.

Figure 9:
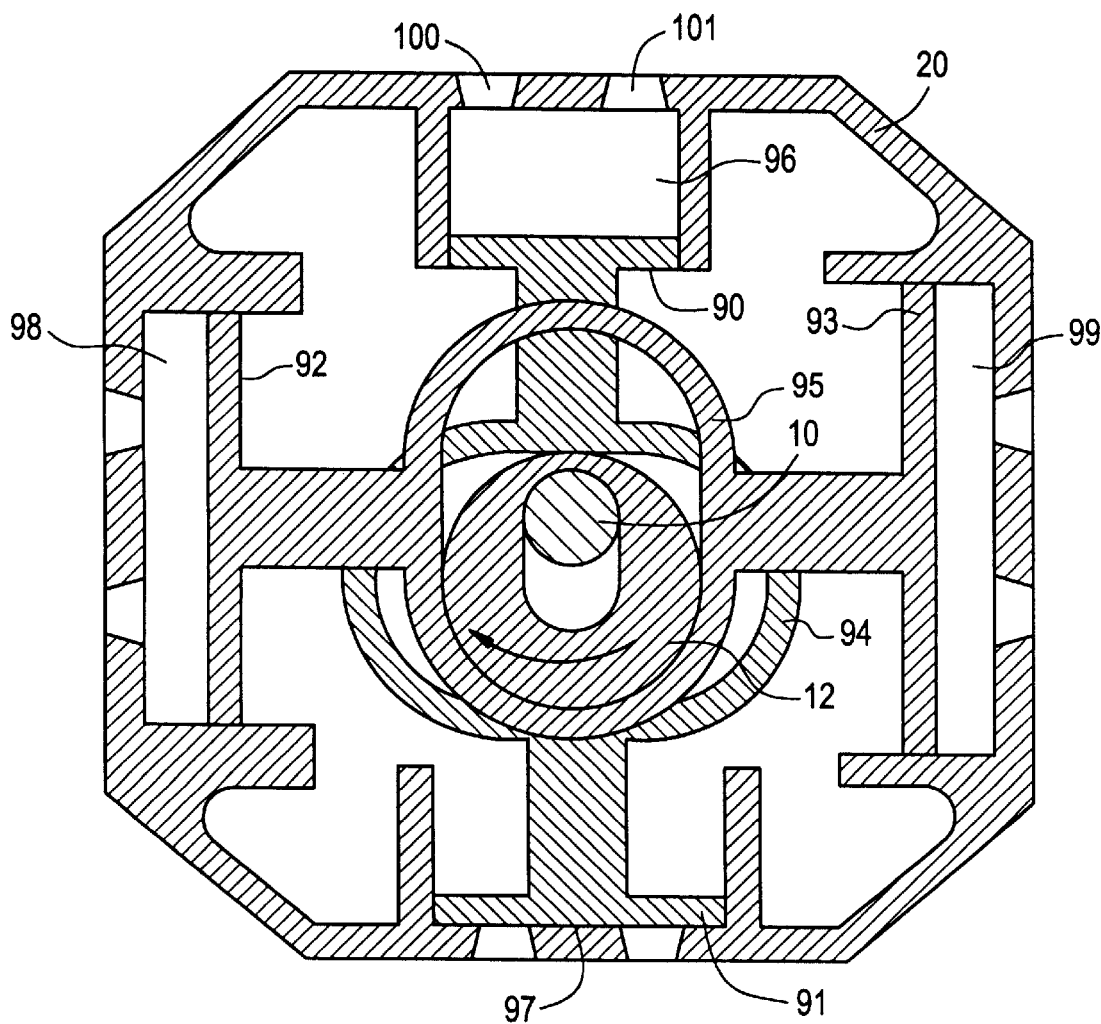

FIG. 9 shows an integrated compressor/expander which differs from the device of FIG. 5 in that both piston pairs operate in stationary bores. There are no traveling cylinders.

A first piston pair of opposing pistons is comprised of a piston 90 with a small surface area and a piston 91 with a somewhat larger surface area. A second piston pair of opposing pistons is comprised of a piston 92 and a piston 93, each of which have a different surface area. It should be noted that pistons of different size could also be used in the embodiments of FIGS. 5 and 8.

Pistons 90 and 91 are rigidly connected to piston drive 94 while pistons 92 and 93 are rigidly connected to piston drive 95. Piston drives 94 and 95 are each solidly connected through bearings, not shown, to variable eccentric drive 12. Eccentric drive 12 is connected to drive shaft 10 through a key 11 (shown in FIGS. 5 and 8 ). The throw of pistons 90–93 is controlled by the position of key 11 along a ramp 46 (shown in FIGS. 5 and 8 ) which determines the amount of eccentricity. The eccentricity of the eccentric drive may be varied from zero (no displacement) to a maximum (maximum displacement.)

Piston 90 is located in a first stationary bore 96; piston 91 is located in a second stationary bore 97; piston 92 is located in a third stationary bore 98; and piston 93 is located in a fourth stationary bore 99. Bore 96 is connected to the exterior of outer case 20 through inlet port 100 and outlet port 101. Suitable valves, not shown, act to open and close the ports. Similarly, inlet and outlet ports are shown for bores 97, 98 and 99 and are provided with suitable valves.

The device of FIG. 9 can also be used in the fuel cell system of FIGS. 6 and 7. For example, bore 97 might be used to supply compressed air to the fuel cell stack; bore 99 might be used to supply compressed air to the reformer; bore 96 might be used as an expander to receive exhaust from the fuel cell stack; and bore 98 might be used as an expander to receive exhaust from the reformer.

The device of FIG. 9, like those of FIGS. 5 and 8, can have a variable or a fixed displacement. It can be either a two piston or a four piston device. Actually, any of the three embodiments can contain even more pistons in the same device by adding piston drives and pistons in solid connection with the eccentric drive and providing cylinders and ports for each piston. If a separate ramp, key and eccentric drive is included along the drive shaft, piston pairs performing different functions can be separately adjusted. For example, in FIG. 9 eccentric drive 12 can be adjustable while eccentric drive 12A (hidden from view directly behind eccentric drive 12 ) can be either fixed or separately adjustable from eccentric drive 12. Piston drive 95 can be solidly connected to eccentric drive 12 while piston drive 94 is solidly connected to eccentric drive 12A. In that manner, the stroke of the pistons 90 and 91 can be different from the stroke of pistons 92 and 93.

The above description points out the unusually great flexibility built into the mechanical design of the integrated device of this invention. The invention has been illustrated with fuel cell systems but many applications can benefit from the flexible design features of the invention.

While the invention has been shown and described with reference to preferred embodiments thereof, it should be understood that changes in the form and details of the invention may be made. Many such variations have been described and other variations and applications may be utilized. For example, reed valves are illustrated in FIG. 5 but any suitable valve could be used. FIG. 5 illustrates four cam rollers 50 to provide driving forces to the traveling chambers. Any suitable low friction bearing drive could be used. FIGS. 5 and 8 illustrate one chamber port moved to connect with both the inlet and outlet ports; there could be separate chamber ports, one for inlet and one for outlet. These and many more engineering variations can be made without departing from the spirit and scope of the invention.

What is claimed is:

1. A fluid displacement apparatus comprising:

a drive shaft;

an eccentric drive connected to said drive shaft;

a first piston connected to said eccentric drive wherein said first piston is provided with orbital movement;

walls defining a traveling chamber holding said first piston, said chamber driven in a reciprocating fashion through the orbital movement of said first piston;

a second piston;

a stationary bore holding said second piston, said second piston connected to said traveling chamber wherein said second piston is moved in reciprocating fashion within said stationary bore by said traveling chamber.

2. The apparatus of claim 1 further including:

an outer case surrounding said traveling chamber and said stationary bore;

first inlet and first outlet ports positioned in said outer case and at least one chamber port located in a wall of said traveling chamber to connect said traveling chamber with the exterior of said outer case through said first inlet and first outlet ports, said first inlet and first outlet ports opened and closed as said walls of said traveling chamber reciprocate within said outer case.

3. The apparatus of claim 2 further including:
second inlet and outlet ports positioned in said outer case;
valves operably located on each of said second inlet and outlet ports to open and close said second ports, said second ports connecting said stationary bore to the exterior of said outer case.

4. The apparatus of claim 3 wherein one piston is connected to operate as an expander and the other piston is connected to operate as a compressor.

5. The apparatus of claim 4 further including
a fuel cell stack;
said first inlet port connected to receive a gaseous fluid;
said first outlet port connected to supply compressed gaseous fluid to said fuel cell stack;
said second inlet port connected to receive exhaust from said fuel cell stack; and
said second outlet port connected to provide exhaust.

6. The apparatus of claim 3 wherein said first piston and said second piston are connected to operate as a two-stage compressor.

7. The apparatus of claim 3 wherein said first and said second piston are connected to operate as a two-stage expander.

8. The apparatus of claim 3 wherein said first and second pistons are connected to operate as a two-stage vacuum pump.

9. The apparatus of claim 3 wherein the eccentricity of said eccentric drive is capable of being set at values ranging from a minimum to a maximum value to provide variable displacement apparatus for fluids, the displacement of said pistons proportional to the eccentricity value.

10. The apparatus of claim 3 further including
a third piston connected to said first piston, walls defining a second traveling chamber holding said third piston, said second traveling chamber driven in reciprocating fashion by said third piston, said outer case surrounding said second traveling chamber, and inlet, outlet and chamber ports to connect said second traveling chamber to the exterior of said outer case; and
a fourth piston connected to said second piston, a second stationary bore holding said fourth piston, said outer case surrounding said second stationary bore, and inlet and outlet ports with valves connecting said stationary bore to the exterior of said outer case.

11. The apparatus of claim 10 wherein two pistons are connected to operate as an expander and two pistons are connected to operate as a compressor.

12. The apparatus of claim 10 wherein the pistons are connected to operate as two-stage compressors.

13. The apparatus of claim 10 wherein the pistons are connected to operate as two-stage expanders.

14. The apparatus of claim 10 wherein the pistons are connected to operate as two-stage vacuum pumps.

15. The apparatus of claim 10 wherein the eccentricity of said eccentric drive is capable of being varied from a mimimum to a maximum value to provide variable displacement apparatus for fluids, the displacement of said pistons proportional to the eccentricity value.

16. The apparatus of claim 15 further including
a fuel cell stack;
two pistons connected as a two-stage compressor with an outlet port connected to supply compressed gaseous fluid to said fuel cell stack; and
two pistons connected as a two-stage expander to receive exhaust from said fuel cell stack.

17. The apparatus of claim 16 further including control over revolutions per minute wherein two degrees of freedom over the output of said fuel cell stack is achieved by utilizing control over the displacement per revolution with said control over revolutions per mintue.

18. The apparatus of claim 10 further including
a fuel cell stack;
two pistons connected as a two-stage compressor with an outlet port connected to supply gaseous fluid to said fuel cell stack; and
two pistons connected as a two-stage expander to receive exhaust from said fuel cell stack.

19. The apparatus of claim 10 wherein said apparatus is a first fluid displacement apparatus and wherein a second fluid displacement apparatus is connected to said drive shaft, said second fluid displacement apparatus comprising
four pistons connected to be driven from said drive shaft, said four pistons mounted within a second outer case, said second outer case with ports and valves to connect the interior to the exterior of said second outer case.

20. The apparatus of claim 19 further including
a fuel cell stack; and
said first and second apparatus connected to supply compressed gaseous fluid to said fuel cell stack.

21. The apparatus of claim 19 further including
a fuel cell stack; and
one of said first apparatus and said second apparatus connected to supply gaseous fluid to said fuel cell stack and the other apparatus connected to receive exhaust from said fuel cell stack.

22. The system of claim 21 further including control over revolutions per minute wherein two degrees of freedom over the output of said fuel cell stack is achieved by utilizing control over the displacement per revolution with said control over revolutions per minute.

23. The apparatus of claim 19 further including
a fuel cell stack; and
said first apparatus and said second apparatus each connected to supply gaseous fluid to said fuel cell stack and each connected to receive exhaust from said fuel cell stack.

24. The apparatus of claim 3 further including a second fluid displacement apparatus connected to said drive shaft, said second fluid displacement apparatus comprising
a second eccentric drive connected to said drive shaft;
a third piston connected to said second eccentric drive wherein said third piston is provided with orbital movement;
second walls defining a second traveling chamber holding said third piston, said second chamber driven in a reciprocating fashion through the orbital movement of said third piston;
a fourth piston;
a second stationary bore holding said fourth piston, said fourth piston connected to said second traveling chamber wherein said fourth piston is moved in reciprocating fashion within said second stationary bore by said second traveling chamber;
a second outer case surrounding said second traveling chamber and said second stationary bore;
third inlet and third outlet ports positioned in said second outer case and at least one chamber port located in a wall of said second traveling chamber to connect said second traveling chamber with the exterior of said second outer case through said third inlet and third outlet ports, said third inlet and third outlet ports opened and closed as said second walls of said second traveling chamber reciprocate within said second outer case;

fourth inlet and fourth outlet ports positioned in said second outer case; and a second set of valves operably located on each of said fourth inlet and fourth outlet ports to open and close said fourth ports, said fourth ports connecting said second stationary bore to the exterior of said second outer case.

25. The apparatus of claim 24 further including
a fuel cell stack;
two pistons operating to supply compressed gaseous fluid to said fuel cell stack; and
two pistons operating as an expander to receive exhaust from said fuel cell stack.

26. The apparatus of claim 25 wherein eccentricity of at least one of said eccentric drives is capable of being varied from a minimum to a maximum value to provide variable displacement apparatus for fluids, the displacement of said pistons proportional to the eccentricity value.

27. The system of claim 26 further including control over revolutions per minute wherein two degrees of freedom over the output of said fuel cell stack is achieved by utilizing control over the displacement per revolution with said control over revolutions per minute.

28. The apparatus of claim 24 further including
a fuel cell stack; and
all four pistons operating to supply compressed gaseous fluid to said fuel cell stack.

29. The apparatus of claim 28 wherein eccentricity of at least one of said eccentric drives is capable of being varied from a minimum to a maximum value to provide variable displacement apparatus for fluids, the displacement of said pistons proportional to the eccentricity value.

30. The system of claim 29 further including control over revolutions per minute wherein two degrees of freedom over the output of said fuel cell stack is achieved by utilizing control over the displacement per revolution with said control over revolutions per minute.

31. A fuel cell system wherein a fuel cell stack is supplied with compressed gaseous fluid generated by an integrated compressor/expander apparatus, said apparatus comprising
a drive shaft;
an eccentric drive connected to said drive shaft;
first and second opposing pistons connected to said eccentric drive wherein said first and second pistons are provided with orbital movement;
walls defining a first traveling chamber holding said first piston and a second traveling chamber holding said second piston, said first and second chambers driven in a reciprocating fashion in one plane through the orbital movement of said first and second pistons;
an outer case surrounding said first and second traveling chambers;
first inlet and first outlet ports positioned in said outer case and at least one first chamber port in a wall of said first traveling chamber to connect said traveling chamber with the exterior of said outer case through said first inlet and first outlet ports, said first inlet and first outlet ports opened and closed as said first traveling chamber reciprocates within said outer case;
second inlet and second outlet ports positioned in said outer case and at least one second chamber port in a wall of said second traveling chamber to connect said traveling chamber with the exterior of said outer case through said second inlet and second outlet ports, said second inlet and second outlet ports opened and closed as said second traveling chamber reciprocates within said outer case;

said first outlet port connected to supply gaseous fluid compressed in said first traveling chamber to said fuel cell stack;

said second inlet port connected to receive the exhaust of said fuel cell stack to perform an expander function and return energy to said drive shaft; and the displacement of said first piston being different from the displacement of said second piston to provide a pressure ratio across said stack.

32. The apparatus of claim 31 wherein the eccentricity of said eccentric drive is capable of being varied from a minimum to a maximum value to provide variable displacement for said compressing and expanding functions, the displacement of said pistons proportional to the eccentricity value.

33. The system of claim 32 further including control over revolutions per minute wherein two degrees of freedom over the output of said fuel cell stack is achieved by utilizing control over the displacement per revolution with said control over revolutions per minute.

34. A fuel cell system wherein a fuel cell stack is supplied with compressed gaseous fluid generated by an integrated compressor/expander apparatus, said apparatus comprising
a drive shaft;
an eccentric drive mounted on said drive shaft;
first and second opposing pistons connected to said eccentric drive wherein said first and second pistons are provided with orbital movement;
walls defining a first traveling chamber holding said first piston and a second traveling chamber holding said second piston, said first and second chambers driven in a reciprocating fashion through the orbital movement of said first and second pistons;
third and fourth opposing pistons positioned at 90 degrees from said first and second pistons, said third and fourth pistons connected to said eccentric drive wherein said third and fourth pistons are provided with orbital movement;
walls defining a third traveling chamber holding said third piston and a fourth traveling chamber holding said fourth piston, said third and fourth chambers driven in a reciprocating fashion through the orbital movement of said third and fourth pistons;
a fuel cell stack;
an outer case surrounding said first, second, third and fourth traveling chambers;
first inlet and first outlet ports positioned in said outer case and at least one first chamber port in a wall of said first traveling chamber to connect said traveling chamber with the exterior of said outer case through said first inlet and first outlet ports, said first inlet and first outlet ports opened and closed as said first traveling chamber reciprocates within said outer case;
second inlet and second outlet ports positioned in said outer case and at least one second chamber port in a wall of said second traveling chamber to connect said traveling chamber with the exterior of said outer case through said second inlet and second outlet ports, said second inlet and second outlet ports opened and closed as said second traveling chamber reciprocates within said outer case;

third inlet and third outlet ports positioned in said outer case and at least one third chamber port in a wall of said third traveling chamber to connect said traveling chamber with the exterior of said outer case through said third inlet and third outlet ports, said third inlet and third outlet ports opened and closed as said third traveling chamber reciprocates within said outer case;

fourth inlet and fourth outlet ports positioned in said outer case and at least one fourth chamber port in a wall of said fourth traveling chamber to connect said traveling chamber with the exterior of said outer case through said fourth inlet and fourth outlet ports, said fourth inlet and fourth outlet ports opened and closed as said fourth traveling chamber reciprocates within said outer case;

said first inlet port connected to a source of gaseous fluid;

said first and second pistons connected as a two-stage compressor, said second outlet port connected to supply gaseous fluid air to said fuel cell stack;

said third and fourth pistons connected as a two-stage expander, said third inlet port connected to receive the exhaust of said fuel cell stack to perform an expander function and return energy to said drive shaft; and the displacement of said first piston and said second piston being different from the displacement of said third piston and said fourth piston to provide a pressure ratio across said stack.

35. The apparatus of claim 34 wherein the eccentricity of said eccentric drive is capable of being varied from a minimum to a maximum value to provide variable displacement for said compressing and expanding functions, the displacement of said pistons proportional to the eccentricity value.

36. The system of claim 34 further including control over revolution per minute wherein two degrees of freedom over the output of said fuel cell stack is achieved by utilizing control over the displacement per revolution with said control over revolutions per minute.

37. A system for supplying compressed gaseous fluid to a first device and a second device comprising:

an outer case for housing first fluid displacement apparatus;

a first chamber located in said outer case, said first chamber connected to said first device;

a second chamber located in said outer case, said second chamber connected to said second device;

a drive shaft extending into said outer case;

an eccentric drive connected to said drive shaft within said outer case;

a first piston connected to said eccentric drive, said first piston located within said first chamber;

a second piston connected to said eccentric drive, said second piston located within said second chamber;

wherein the volumetric displacement of said first chamber is greater than the volumetric displacement of said second chamber per piston stroke thereby supplying a different volume of gaseous fluid to each of said first and said second devices;

a third piston connected to said first piston and located 180° therefrom;

a fourth piston connected to said second piston and located 180° therefrom;

a third chamber for holding said third piston;

a fourth chamber for holding said fourth pistons;

two chambers are connected to supply compressed gaseous fluid to said first device; and the other two chambers are connected to supply gaseous fluid to said second device.

38. The system of claim 37 further including a second multi-piston fluid displacement apparatus connected to said driveshaft, two chambers of said second fluid displacement device connected as an expander to receive exhaust from said first device and two chambers connected as an expander to receive exhaust from said second device.

39. The system of claim 38 wherein the volumetric displacement of the expander chambers connected to said first device are different from the volumetric displacement of the compression chambers connected to said first device thereby creating a pressure ratio (PP) across said first device equal to:

$$P_R = \frac{\text{compressor displacement}}{\text{expander displacement}}.$$

40. The system of claim 39 wherein said first device is a fuel cell stack and said second device is a reformer.

41. The system of claim 40 wherein the eccentricity of said eccentric drive is capable of being varied from a minimum valve to a maximum value, the volumetric displacement of each chamber proportional to the eccentricity value.

42. The system of claim 41 further including control over revolutions per minute wherein two degrees of freedom over the output of said fuel cell stack is achieved by utilizing control over the displacement per revolution with said control over revolutions per minute.

43. The system of claim 37 further including a second fluid displacement apparatus connected to said drive shaft, one chamber of said second fluid displacement apparatus connected as an expander to receive exhaust from said first device and one chamber connected as an expander to receive exhaust from said second device.

44. The apparatus of claim 43 wherein the volumetric displacement of the expander chambers connected to said first device are different from the volumetric displacement of the compression chambers connected to said first device thereby creating a pressure ratio (PP) across said first device equal to:

$$P_R = \frac{\text{compressor displacement}}{\text{expander displacement}}.$$

45. The system of claim 44 wherein said first device is a fuel cell stack and said second device is a reformer.

46. A system for supplying compressed gaseous fluid to a first device and a second device comprising:

an outer case for housing first fluid displacement apparatus;

a first chamber located in said outer case, said first chamber connected to said first device;

a second chamber located in said outer case, said second chamber connected to said second device;

a drive shaft extending into said outer case;

an eccentric drive connected to said drive shaft within said outer case;

a first piston connected to said eccentric drive, said first piston located within said first chamber;

a second piston connected to said eccentric drive, said second piston located within said second chamber;

wherein the volumetric displacement of said first chamber is greater than the volumetric displacement of said second chamber per piston stroke thereby supplying a different volume of gaseous fluid to each of said first and said second devices;

a third piston connected to said first piston and located 180° therefrom;

a fourth piston connected to said second piston and located 180° therefrom;

a third chamber for holding said third piston;

a fourth chamber for holding said fourth piston; and three of the four chambers are connected to supply gaseous fluid to said first device and one chamber is connected to supply gaseous fluid to said second device.

47. A system for supplying compressed gaseous fluid to a first device and a second device comprising:

and outer case for housing first fluid displacement apparatus;

a first chamber located in said outer case, said first chamber connected to said first device;

a second chamber located in said outer case, said second chamber connected to said second device;

a drive shaft extending into said outer case;

an eccentric drive connected to said drive shaft within said outer case;

a first piston connected to said eccentric drive, said first piston located within said first chamber;

a second piston connected to said eccentric drive, said second piston located within said second chamber;

wherein the volumetric displacement of said first chamber is greater than the volumetric displacement of said second chamber per piston stroke thereby supplying a different volume of gaseous fluid to each of said first and said second devices;

a third piston connected to said first piston and located 180° therefrom;

a fourth piston connected to said second piston and located 180° therefrom;

a third chamber for holding said third piston;

a fourth chamber for holding said fourth piston; and at least one chamber is connected as an expander to receive exhaust from said first device.

48. The system of claim 47 wherein the volumetric displacement of the expander chamber connected to said first device is different from the volumetric displacement of the compression chamber connected to said first device thereby creating a pressure ratio ($P_r$) across said first device equal to:

$$P_R = \frac{\text{compressor displacement}}{\text{expander displacement}}.$$

49. The system of claim 48 wherein one chamber is connected as an expander to receive exhaust from said second device.

50. The system of claim 49 wherein said first device is a fuel cell stack and said second device is a reformer.

51. The system of claim 50 wherein the eccentricity of said eccentric drive is capable of being varied from a minimum valve to a maximum value, the volumetric displacement of each chamber proportional to the eccentricity value.

52. A fluid displacement apparatus comprising:

a drive shaft;

an eccentric drive connected to said drive shaft;

a first piston and an opposing second piston, said first piston and said second piston connected together and connected in driven relationship to said eccentric drive wherein said pistons are moved in a reciprocating fashion;

an outer case;

a first stationary bore for holding said first piston within said outer case;

a second stationary bore for holding said second piston within said outer case;

a first inlet port and a first outlet port connecting said first stationary bore to the exterior of said outer case;

a second inlet port and a second outlet port connecting said second stationary bore to the exterior of said outer case;

the displacement of said first piston larger than the displacement of said second piston;

a fuel cell stack;

said first stationary bore connected as a compressor to supply compressed gaseous fluid to said fuel cell stack; and said second stationary bore connected as an expander to receive exhaust from said fuel cell stack, wherein a pressure ratio is produced across said fuel cell stack.

53. The fluid displacement device of claim 52 wherein the eccentric drive is capable of being varied from a maximum value to a minimum value, the volumetric displacement of each bore proportional to the eccentricity value.

54. The system of claim 53 further including control over revolutions per minute wherein two degrees of freedom over the output of said fuel cell stack is achieved by utilizing control over the displacement per revolution with said control over revolutions per minute.

55. The fluid displacement apparatus of claim 52 further including:

a third piston and an opposing fourth piston, said third piston and said fourth piston connected together and connected in driven relationship to said eccentric drive wherein said third and fourth pistons are moved in a reciprocating fashion;

a third stationary bore for holding said third piston within said outer case;

a fourth stationary bore for holding said fourth piston within said outer case;

a third inlet port and a third outlet port connecting said third stationary bore to the exterior of said outer case; and a fourth inlet port and a fourth outlet port connecting said fourth stationary bore to the exterior of said outer case;

the displacement of said first piston equal to or greater than the displacement of said second piston and the displacement of said third piston equal to or greater than the displacement of said fourth piston, the displacement of said first piston greater than the displacement of said third piston.

56. The fluid displacement apparatus of claim 55 wherein
said apparatus connected as a compressor for a portion of the bores to supply gaseous fluid to said fuel cell stack and connected as an expander for a portion of the bores to receive exhaust from said fuel cell stack wherein a pressure ratio is produced across the fuel cell stack.

57. The fluid displacement apparatus of claim 56 wherein the eccentric drive is capable of being varied from a maximum value to a minimum value, the volumetric displacement of each bore proportional to the eccentricity value.

58. The system of claim 57 further including control over revolutions per minute wherein two degrees of freedom over the output of said fuel cell stack is achieved by utilizing control over the displacement per revolution with said control over revolutions per minute.

59. The fluid displacement apparatus of claim 56 further including:
a reformer;
said apparatus connected as a compressor for a portion of the bores to supply compressed gaseous fluid to said reformer;
said apparatus connected as a expander for a portion of the bores to receive exhaust from said reformer.

60. The fluid displacement apparatus of claim 59 wherein the eccentric drive is capable of being varied from a maximum value to a minimum value, the volumetric displacement of each bore proportional to the eccentricity value.

61. The system of claim 60 further including control over revolutions per minute wherein two degrees of freedom over the output of said fuel stack is achieved by utilizing control over the displacement per revolution with said control over revolutions per minute.

62. A system for supplying compressed gaseous fluid to a first device and a second device at different pressures from a single fluid displacement apparatus comprising:
a drive shaft;
an eccentric drive connected to said drive shaft;
a first piston and an opposing second piston, said first piston and said second piston connected together and connected in driven relationship to said eccentric drive wherein said pistons are moved in a reciprocating fashion;
an outer case;
a first stationary bore for holding said first piston within said outer case;
a second stationary bore for holding said second piston within said outer case;
a first inlet port and a first outlet port connecting said first stationary bore to the exterior of said outer case; and
a second inlet port and a second outlet port connecting said second stationary bore to the exterior of said outer case;
the displacement of said first piston larger than the displacement of said second piston;
wherein the volumetric displacement of said first bore is greater than the volumetric displacement of said second bore per piston stroke thereby supplying a different volume of gaseous fluid to each of said first and said second devices.

63. The system of claim 62 wherein the eccentric drive is capable of being varied from a maximum value to a minimum value, the volumetric displacement of each bore proportional to the eccentricity value.

64. The system of claim 63 further including control over revolutions per minute wherein two degrees of freedom over the output of said first device and said second device is achieved by utilizing control over the displacement per revolution with said control over revolutions per minute.

65. The system of claim 62 further including:
a third piston and an opposing fourth piston, said third piston and said fourth piston connected together and connected in driven relationship to said eccentric drive wherein said third and fourth pistons are moved in a reciprocating fashion;
a third stationary bore for holding said third piston within said outer case;
a fourth stationary bore for holding said fourth piston within said outer case;
a third inlet port and a third outlet port connecting said third stationary bore to the exterior of said outer case;
a fourth inlet port and a fourth outlet port connecting said fourth stationary bore to the exterior of said outer case;
the displacement of said first piston equal to or greater than the displacement of said second piston and the displacement of said third piston equal to or greater than the displacement of said fourth piston, the displacement of said first piston greater than the displacement of said third piston.

66. The system of claim 65 wherein a first portion of the bores are connected to said first device and a second portion of the bores are connected to said second device to supply gaseous fluid at different pressures to the two devices.

67. The system of claim 66 wherein a third portion of the bores are connected to said first device to receive exhaust therefrom and wherein a pressure ratio is developed across said first device.

68. The system of claim 65 wherein the eccentric drive is capable of being varied from a maximum value to a minimum value, the volumetric displacement of each bore proportional to the eccentricity value.

69. The system of claim 68 further including control over revolutions per minute wherein two degrees of freedom over the output of said first device and said second device is achieved by utilizing control over the displacement per revolution with said control over revolutions per minute.

70. The method of supplying compressed gaseous fluid to a first device and a second device at different pressures produced by one fluid displacement apparatus comprising
providing a first multi-piston fluid displacement apparatus capable of being connected to supply compressed gaseous fluid to said first device at a first volume per stroke and capable of being connected to supply compressed gaseous fluid to said second device at a second volume per stroke different from said first volume; and
providing variable displacement volume per stroke by altering the eccentricity of an eccentric drive used to drive the pistons.

71. The method of claim 70 wherein said first device is a fuel cell stack and said second device is a reformer.

72. The method of claim 70 further providing two degrees of freedom over the output of said first device and said second device by utilizing control over the displacement per revolution with control over revolutions per minute.

73. The method of supplying compressed gaseous fluid to a first device and receiving exhaust from said first device to recover energy comprising providing a multi-piston fluid displacement apparatus capable of being connected to supply compressed gaseous fluid to said first device from a first chamber and capable of receiving exhaust from said first device in a second chamber, the volumetric displacement of said first and second chambers being different; and providing variable displacement volume per stroke by altering the eccentricity of an eccentric drive used to drive the pistons.

74. The method of claim 73 further providing two degrees of freedom over the output of said first device and said second device by utilizing control over the displacement per revolution with control over revolutions per minute.

75. The method of supplying compressed gaseous fluid to a first device and receiving exhaust from said first device to recover energy comprising providing a multi-piston fluid displacement apparatus capable of being connected to supply compressed gaseous fluid to said first device from a first chamber and capable of receiving exhaust from said first device in a second chamber, the volumetric displacement of said first and second chambers being different;

developing a pressure ratio across said first device equal to:

$$P_R = \frac{\text{compressor displacement}}{\text{expander displacement}}; \quad \text{and}$$

providing variable displacement volume per stroke by altering the eccentricity of an eccentric drive used to drive the pistons.

76. The method of claim 75 further providing two degrees of freedom over the output of said first device and said second device by utilizing control over the displacement per revolution with control over revolutions per minute.

77. A system for supplying compressed gaseous fluid to a device comprising a two piston fluid displacement apparatus, the volumetric displacement of a first piston greater than the volumetric displacement of a second piston;

said device connected to receive a supply of compressed gaseous fluid from said first piston acting as a compressor and to supply exhaust to said second piston acting as an expander wherein a pressure ratio is developed across said device equal to:

$$P_R = \frac{\text{compressor displacement}}{\text{expander displacement}};$$

wherein said fluid displacement apparatus is driven by an eccentric and wherein eccentricity of said eccentric drive is capable of being varied from a minimum to a maximum value to provide variable displacement apparatus for fluids, the displacement of said pistons proportional to the eccentricity value; and including control over revolutions per minute wherein two degrees of freedom over the output of said device is achieved by utilizing control over the displacement per revolution with said control over revolutions per minute.

* * * * *